United States Patent Office 3,510,382
Patented May 5, 1970

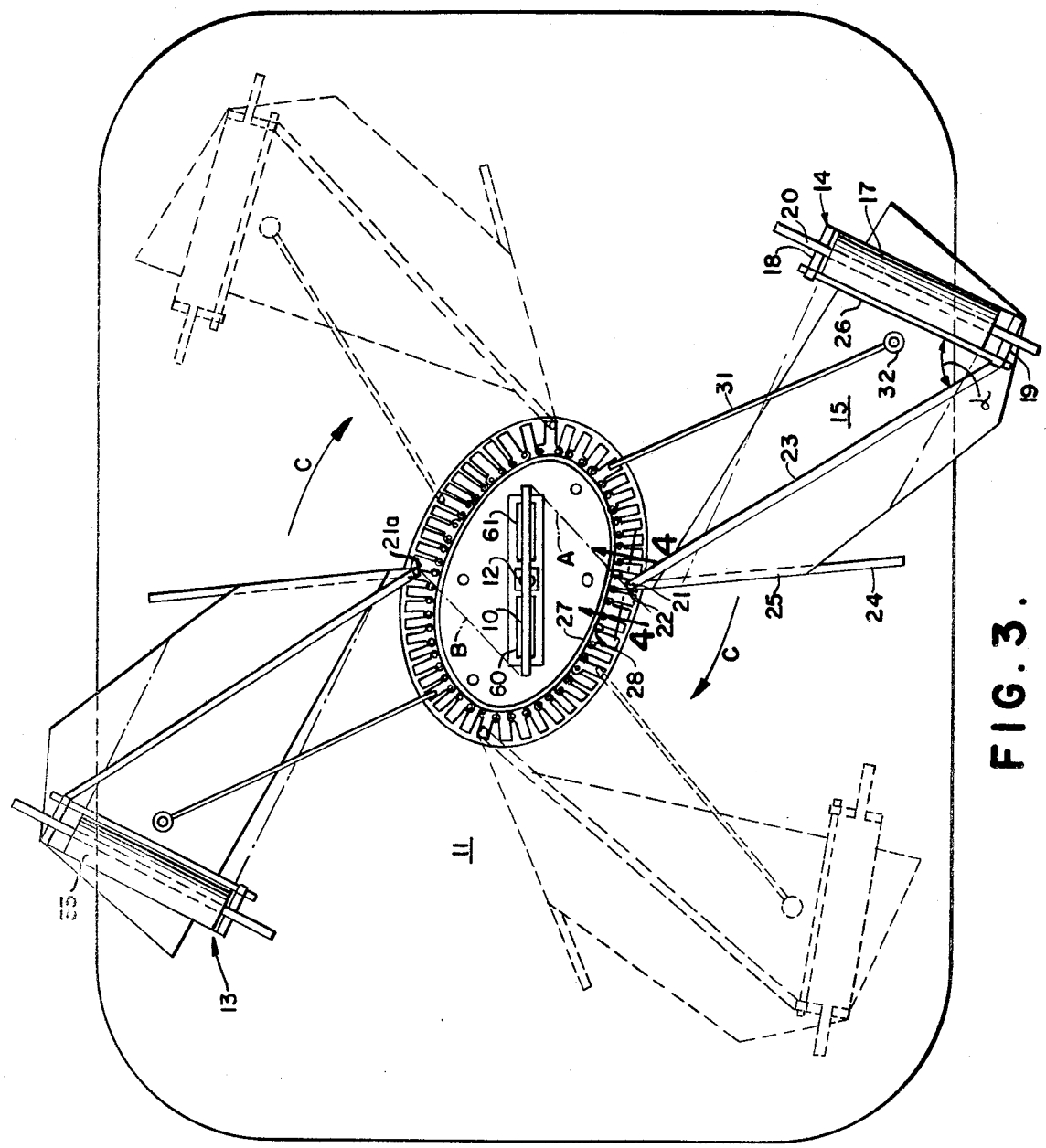
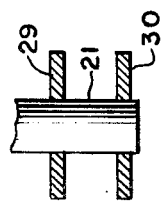
FIG. 3.
FIG. 4.

3,510,382
APPARATUS FOR CROSSLAYING FLEXIBLE WEBS
Ronald H. Wideman, Menasha, Jerome W. Riese, Neenah, and Anthony S. Hubin, Appleton, Wis., assignors to Kimberly-Clark Corporation, Neenah, Wis., a corporation of Delaware
Filed Mar. 10, 1967, Ser. No. 622,187
Int. Cl. B31c 3/00; B65h 19/02, 19/06
U.S. Cl. 156—425                                12 Claims

ABSTRACT OF THE DISCLOSURE

A machine for spirally winding flexible webs onto a flat mandrel by means of web guides moving about the mandrel and moving toward and away from the central axis of the mandrel so that the velocity of the webs passing around the guides remains constant.

BACKGROUND OF THE INVENTION

The invention relates to apparatus for crosslaying flexible sheet material webs about a mandrel and more particularly to apparatus for forming a composite multi-ply web product in which the plies extend diagonally with respect to the longitudinal dimension of the product.

It has previously been proposed, for example, in the patent to Roland B. Respess, No. 1,515,792, issued Nov. 18, 1924, and in the patent to William W. Rowe, No. 2,213,290, issued Sept. 3, 1940, to spirally wind webs of sheet material or threads about tubular barrel-like mandrels and to pull the spirally wound webs or threads off the ends of the mandrels and flatten them by passing them between pull rolls so as to form flat double sheets. In view of the fact that such a mandrel may be circular in cross section, the web material may be made to pass onto the mandrel at a constant speed; however, pulling the spirally wound web material off the end of the mandrel and flattening it generally gives rise to undesired wrinkles in the final product. It has also been proposed to spirally wind threads or webs about flat mandrels, formed for example, by two longitudinally extending pins, such proposals being, for example, disclosed in the patent to Howard I. Morris, No. 1,727,839, issued Sept. 10, 1929, and in the patent to Andrew E. Currier, No. 1,460,949, issued July 3, 1923. A formed web is withdrawn easier from such a mandrel; however, the use of flat mandrels in making the composite web or thread products raises the problem of maintaining the threads or webs under constant tension, particularly at high speeds of the apparatus, so that wrinkles are not formed in the composite product due to changes in web or thread tension.

SUMMARY OF THE INVENTION

It is an object of the present invention to provide a spiral winding apparatus utilizing a mandrel which is substantially flat and including an improved web guide apparatus so arranged to cause the velocity of the webs or threads to remain substantially constant as the webs or threads are wound onto the mandrel. In carrying out the invention, we preferably provide a guide for a web, for example, being spirally wound on a flat mandrel which extends parallel with the axis of the mandrel and which moves toward and away from the axis of the mandrel as the guide moves about the mandrel, and preferably the guide is made to move in a path in the form of an elongated loop having its major axis disposed at an acute angle with respect to the transverse axis of the flat mandrel for securing this result.

The invention consists of the novel constructions, arrangements and devices to be hereinafter described and claimed for carrying out the above stated objects, and such other objects, as will be apparent from the following description of preferred forms of the invention.

BRIEF DESCRIPTION OF THE DRAWINGS

FIG. 3 is a top plan view of the crosslaying apparatus;

FIG. 4 is a sectional view on an enlarged scale taken on line 4—4 of FIG. 3;

Like characters of references designate like parts in the several views.

DESCRIPTION OF PREFERRED EMBODIMENTS

Figure 1:
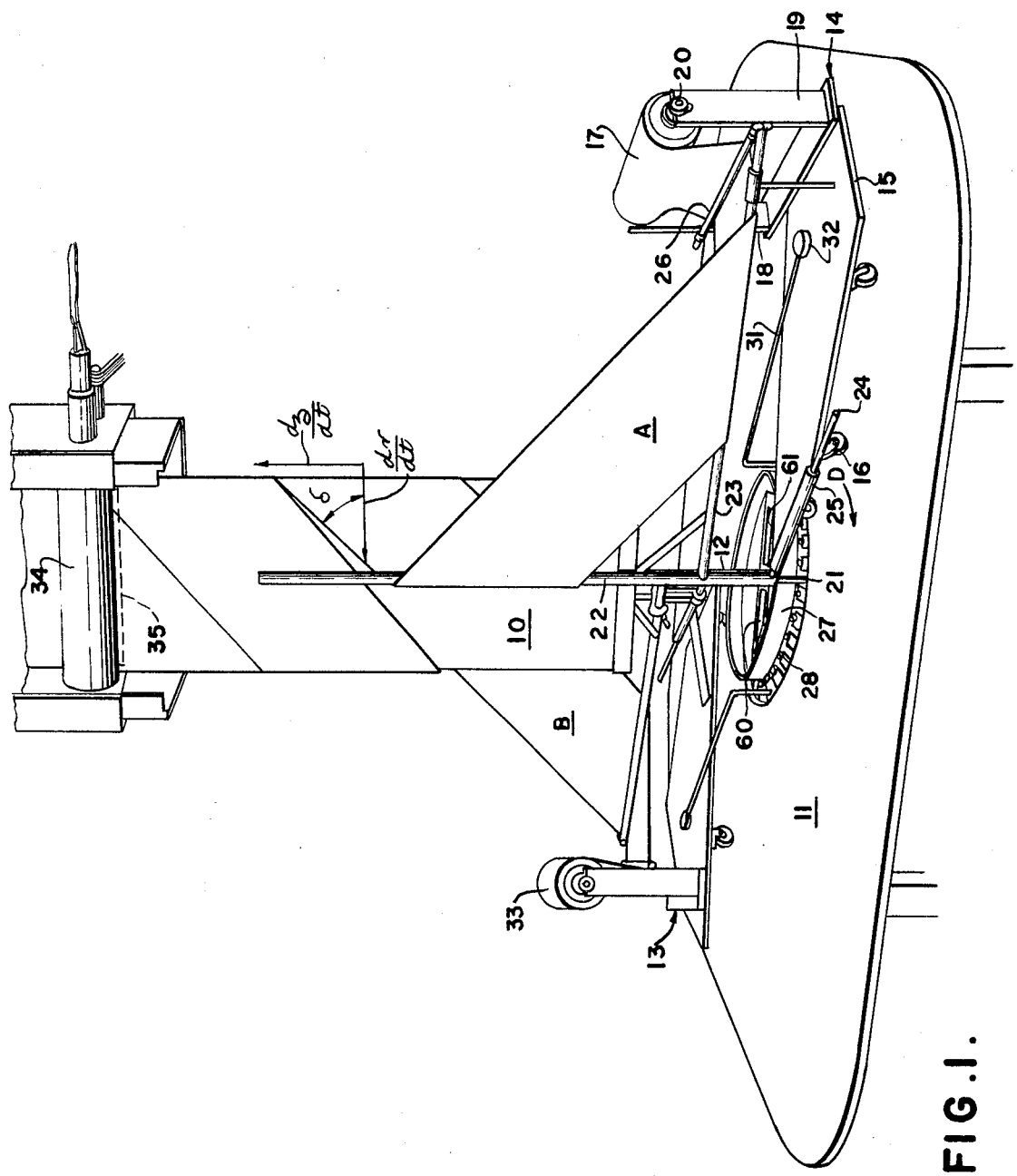
FIG. 1 is a perspective view of the crosslaying apparatus of the invention and including a central mandrel of rigid sheet material about which webs of flexible sheet material are wound by means of vertical guides that move about the mandrel in a path that is controlled by means of a cam extending about the mandrel.

Referring now to the drawings, the illustrated crosslaying apparatus may be seen to comprise a mandrel 10 which is in the form of a flat plate of rigid sheet material. The mandrel 10 is supported with respect to a stationary table 11 by means of an upwardly extending bifurcated shaft 12 having its lower end extending through the table 11 and its upper bifurcated end embracing the mandrel 10. A pair of satellite roll carriages 13 and 14 are disposed on opposite sides of the mandrel 10 and are arranged to move on the table 11. The carriages 13 and 14 are substantially identical.

The carriage 14 comprises a support 15 of sheet material which is movably disposed on the table 11 by means of a plurality of casters 16. A roll 17 of flexible sheet material, such as a web A of creped paper tissue having filaments or fibers within it extending longitudinally of the web, for example, is supported from the support 15 by a pair of standards 18 and 19. The roll 17 has a supporting core 20 extending through it, and the ends of the core 20 rest in correspondingly shaped slots in the upper ends of the standards 18 and 19.

The carriage 14 is moved about the mandrel 10 by means of an upwardly extending shaft 21 that moves about the mandrel 10. A sleeve 22 is disposed on the shaft 21, and sidewardly extending shafts 23 and 24 are fixed with respect to the sleeve 22. A sleeve 25 fits about the shaft 24, and the sleeve 25 is fixed by any suitable means to a forward edge of the support 15. The shaft 23 extends horizontally above the support 15 and is fixed at or adjacent its end by any suitable means with respect to the support 15 and the standard 19. A sheet guide bar 26 extends between the standards 18 and 19 and is fixed with respect to the standards. The shaft 23 extends at an acute angle α with respect to the guide bar 26 as will be noted from FIG. 3, and the bar 26 extends parallel with the core 20.

A cam 27 of sheet material extends upwardly out of the table 11, and an endless chain 28 is movably disposed about the external surface of the cam 27. The endless chain 28 has a pair of outwardly extending, vertically spaced lugs 29 and 30; and the shaft 21 extends through openings in these lugs so that the shaft 21 is held vertically. The chain 28 is provided with a similar pair of lugs spaced from the lugs 29 and 30 about the periphery of the chain, and a drag link 31 at one end fits into openings in these lugs and is pivotally connected at its other end to the support 15 by means of a bearing 32.

The carriage 13 is of the same type as the carriage 14 and carries a roll 33 of flexible sheet material B. The carriage 13 is moved by means of a vertical shaft 21a which corresponds to the shaft 21 and is carried by the chain 28 in the same manner as the chain 28 carries the shaft 21.

It will be observed from FIG. 3 that the shaft 21, for a certain position of the carriage 14, is positioned oppositely to the shaft 21a with respect to the longitudinal center of the mandrel 10; in other words, the shafts 21 and 21a are substantially at 180 degrees with respect to each other considering their movement with respect to the longitudinal center of the mandrel 10. The cam 27 has such a shape that the shafts 21 and 21a move toward and away from the longitudinal center of the mandrel 10 as the shafts 21 and 21a move about the mandrel 10, this shape of the cam 27 and this movement of the shafts 21 and 21a being for the purpose of causing the webs A and B to unwind from their respective rolls 17 and 33 at a uniform rate as the chain 28 moves at a uniform velocity about the cam 27 for thereby causing a uniform tension to be maintained in the webs A and B as they are wound from the rolls 17 and 33 onto the mandrel 10.

Figure 2:
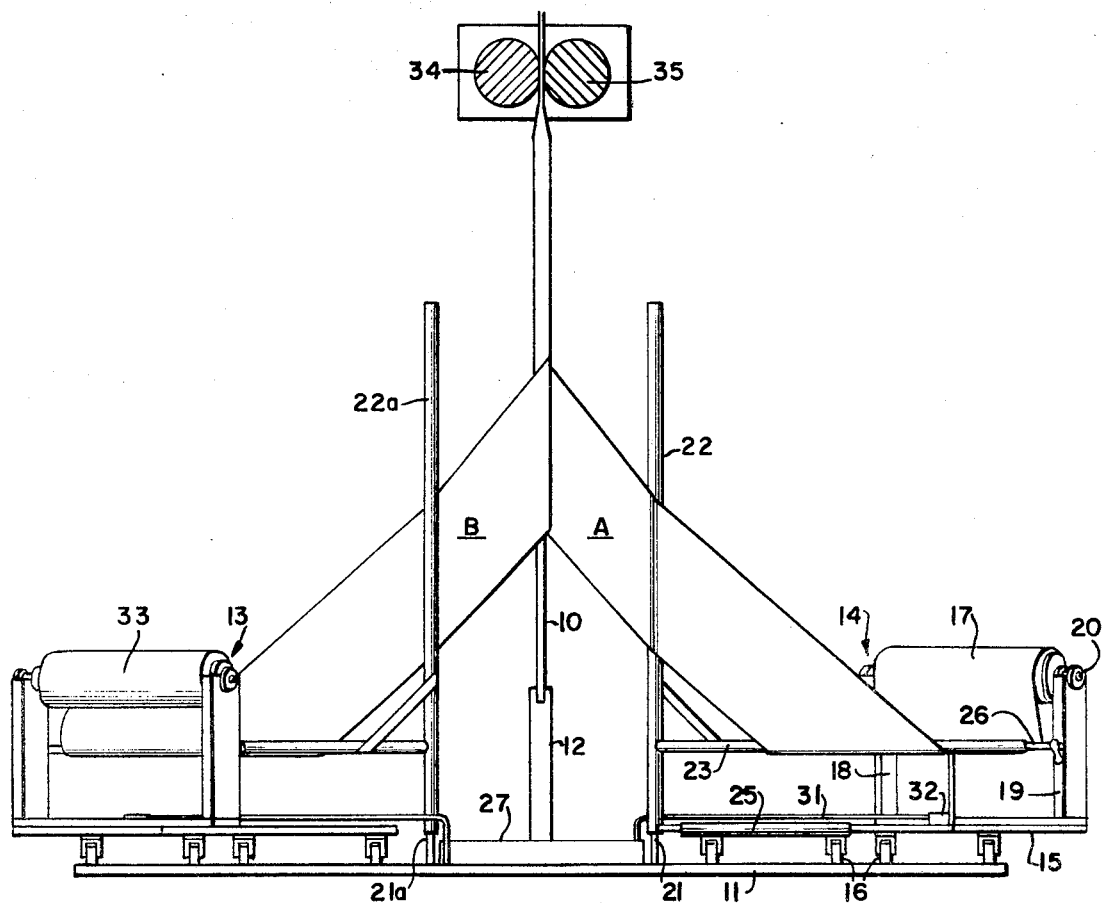
FIG. 2 is a side elevational view of the crosslaying apparatus.
Figure 7:
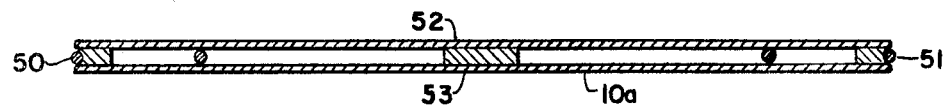
FIG. 7 is a sectional view of an enlarged scale taken on line 7—7 of FIG. 5.
Figure 8:
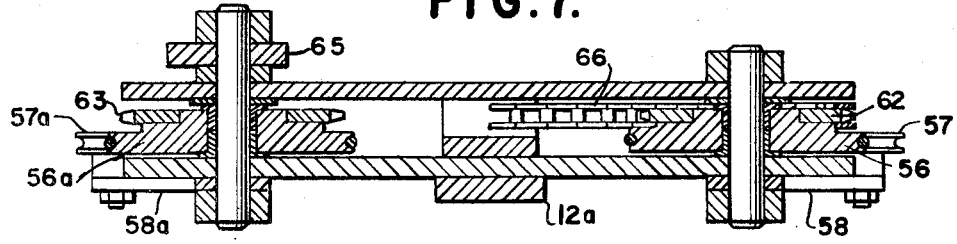
FIG. 8 is a sectional view on an enlarged scale taken on line 8—8 of FIG. 5.
Figure 9:
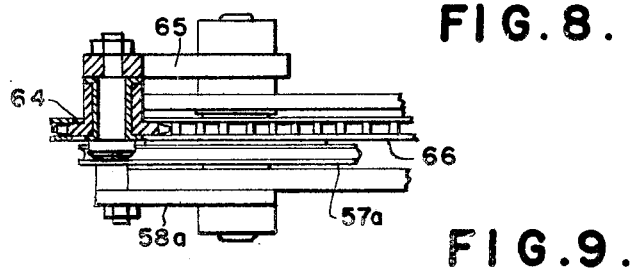
FIG. 9 is a sectional view on an enlarged scale taken on line 9—9 of FIG. 5.

As will be observed from FIGS. 1 and 2, the web A extends from the roll 17, under the bar 26, around the shaft 23 and from thence around the sleeve 22 disposed on the shaft 21 onto the mandrel 10; and, as the shaft 21 and the carriage 14 move about the mandrel 10, the web A is wound onto the mandrel. The web B extends over corresponding parts from the roll 33 and is likewise wound onto the mandrel 10 as the carriage 13 moves about the mandrel 10 substantially opposite the carriage 14.

A pair of calender rolls 34 and 35 are disposed above the mandrel 10 and have a nip substantially aligned with, but slightly spaced from, the upper end of the mandrel 10. The rolls 34 and 35 are driven at a uniform speed and act to pull the webs A and B off of the mandrel 10 and through the nip of the rolls 34 and 35. At least one of the rolls 34 and 35 is preferably heated, and the fibers in the webs A and B in this case are either of a thermoplastic nature or else the webs A and B have other thermoplastic material in them so that the heated roll causes the contacting faces of the webs A and B to adhere to each other to form a composite laminated flat web in which the fibers extend at acute angles with respect to the longitudinal dimension of the finished product.

The mandrel 10a (see FIGS. 5 to 9) may be utilized in lieu of the mandrel 10 if desired. The mandrel 10a has a pair of round belts 50 and 51 extending along opposite edges, and these belts are arranged to travel upwardly along these edges at the same speed as the webs A and B move upwardly on the mandrel so that upward movement of the webs A and B to the nip between the calender rolls 34 and 35 is facilitated. For types of material for the webs A and B having relatively rough surfaces, the mandrel 10a with the belts 50 and 51 is quite desirable in order to be sure that the webs A and B as wound on the mandrel travel upwardly without slippage or separating motion with respect to each other.

The mandrel 10a comprises a pair of spaced plates 52 and 53 of rigid sheet material which are suitably connected and braced with respect to each other. A pair of rollers 54 and 55 are provided between the plates 52 and 53 respectively at the lower and upper edges of these parts, and the belt 51 extends between these rollers 54 and 55. A drive roll 56 is provided below the mandrel 10a; and the belt 51, as will be observed from FIG. 5, extends around the rollers 54 and 55 and the roll 56. A takeup roll 57 is provided to be effective on the belt 51 between the roll 56 and the roller 54, and the takeup roll 57 is carried by a swing arm 58 rotatably disposed about the center of rotation of the roll 56. The mandrel 10a is supported by means of a shaft 12a taking the place of the shaft 12 and extending through the table 11, and a spring 59 is provided between the shaft 12a and the arm 58 for the purpose of pulling the roll 57 toward the shaft 12a to maintain the belt 51 under tension about the roll 56 and the rollers 54 and 55.

Figures 5, 6:
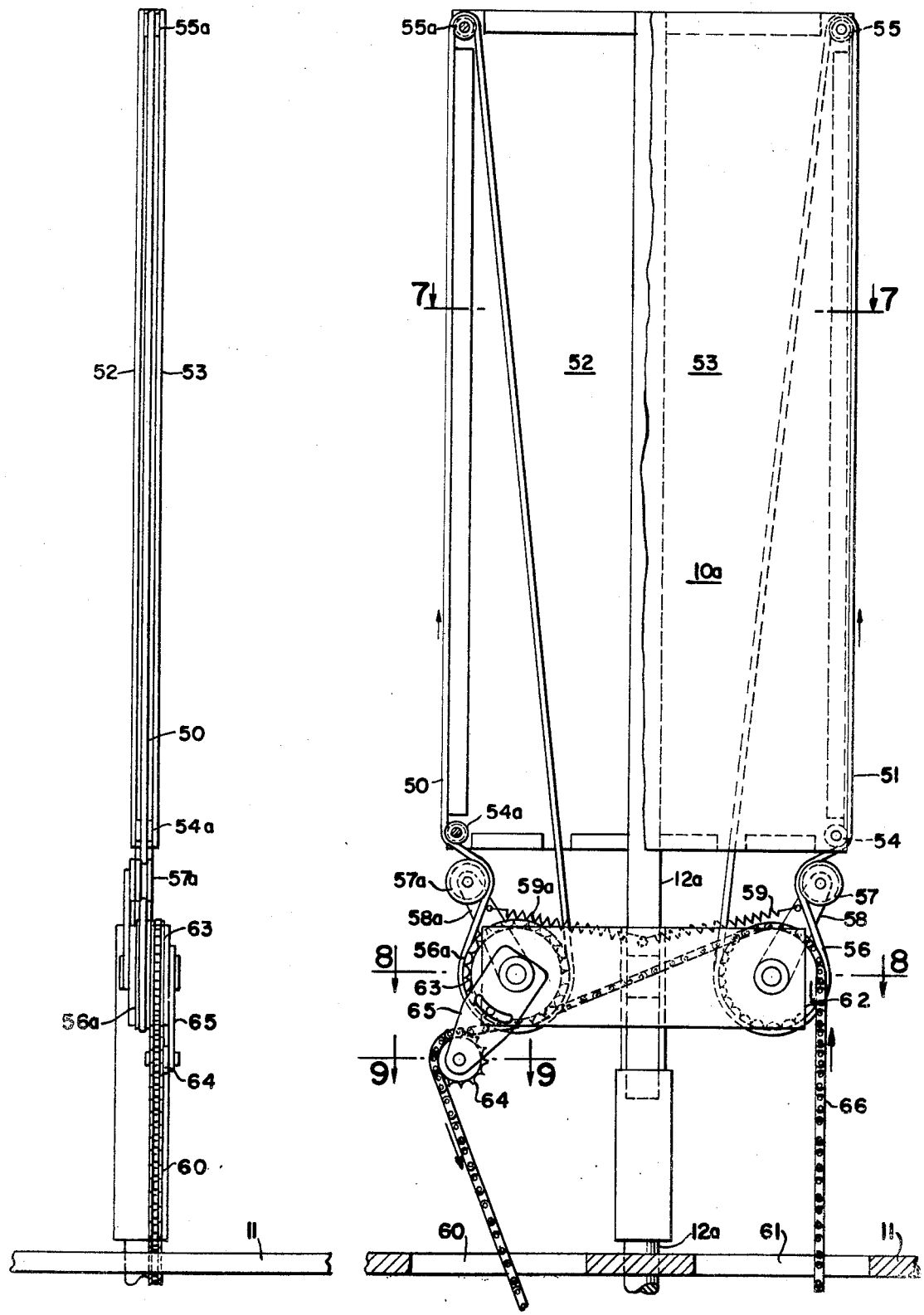
FIG. 5 is a side elevational view of a modified type of mandrel that may be used in the apparatus.
FIG. 6 is an end elevational view of the modified type of mandrel.

The belt 50 is disposed about the rollers 54a and 55a and rolls 56a and 57a corresponding to the parts 54, 55, 56 and 57 previously described in connection with the belt 51. The roll 57a is disposed on a swing arm 58a which is acted on by a spring 59a, and these parts correspond to the parts 58 and 59 previously described. A pair of slots 60 and 61 are provided in the table 11 within the cam 27 and adjacent and opposite to each other with respect to the opening for receiving the shaft 12 or else the shaft 12a. A drive sprocket 62 is mounted coaxially with and is fixed with respect to the roll 56, and a drive sprocket 63 is mounted coaxially with and is fixed with respect to the roll 56a. An idler sprocket 64 is mounted on an arm 65 depending downwardly from the center of rotation of the roll 56a, and a drive chain 66 extends through the slots 60 and 61 and around the sprockets 62, 63 and 64, as illustrated in FIG. 5 in particular, for the purpose of driving the rolls 56 and 56a. The chain 66 is driven by any suitable drive mechanism (not shown) below the table 11.

Figure 10:
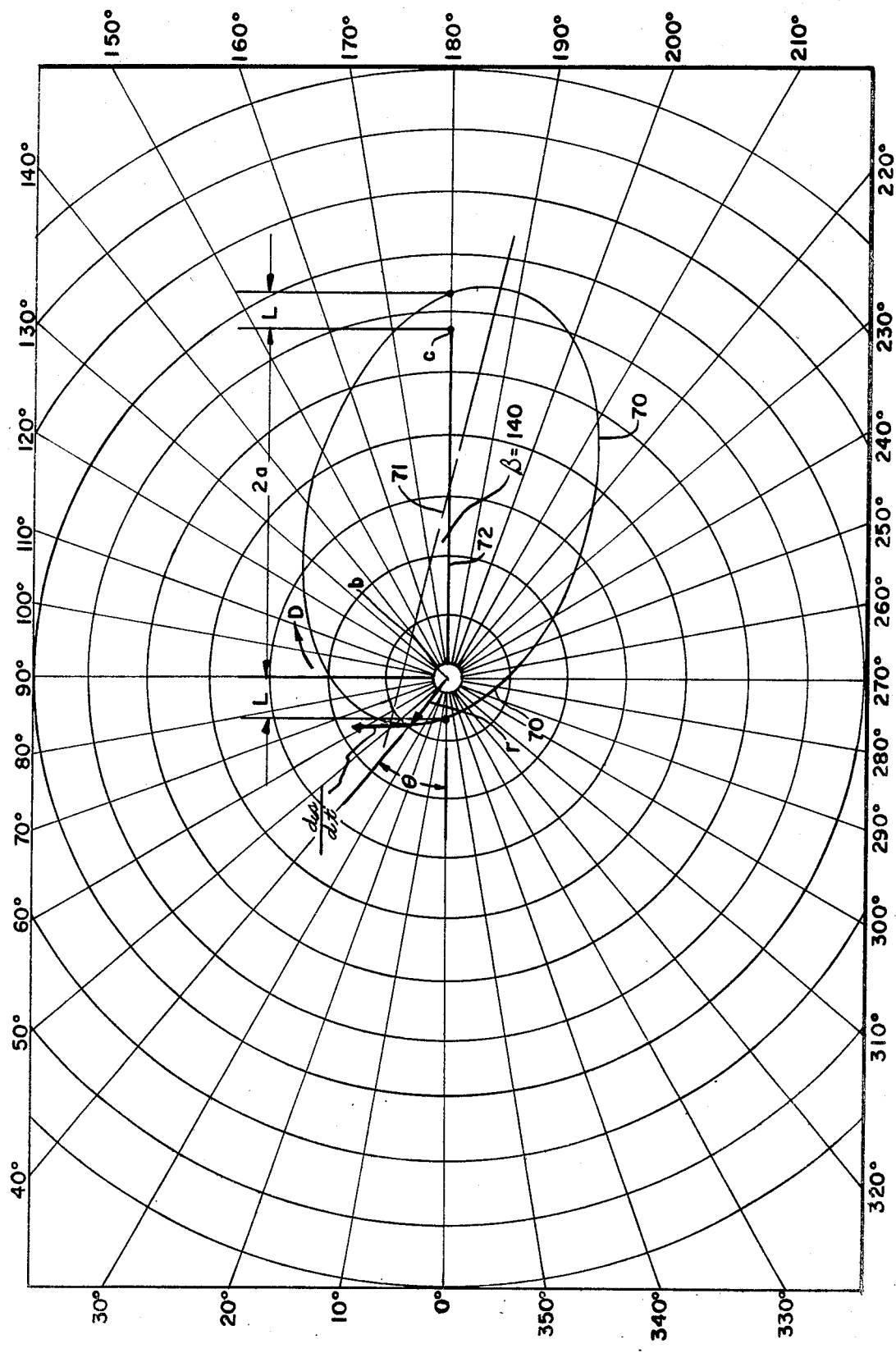
FIG. 10 is a view showing the outline of the paths of the vertical guides.

The cam 27 has such a shape, as viewed in plan or in cross section at right angles to the shaft 12 or shaft 12a, so that the shafts 21 and 21a and the sleeves 22 and 22a move in a path of travel toward and away from the longitudinal center of the mandrel whereby the webs A and B unwind from their rolls 17 and 33 at a uniform speed, assuming that the chain 28 is driven at a uniform speed, and it is also assumed that the webs A and B when on the mandrel travel upwardly on the mandrel at a constant speed which is represented by the vector $dz/dt$ shown in FIG. 1. Wrinkling of the webs A and B on the mandrel 10 or mandrel 10a, which might be due to variations in tension in the webs A and B, is therefore avoided. In order to accomplish this result, it has been found that the path of travel of the sleeves 22 and 22a and shafts 21 and 21a, in cross section at right angles to the shafts 12 or 12a, should be defined by the following equation:

$$r = L \left(\frac{L+2a}{L}\right)^{\theta/180°} \qquad (1)$$

where, referring to FIG. 10 showing this path 70 of travel, $2a$ is the transverse width of the mandrel 10 or 10a; $L$ is the separation between the longitudinal center of the shaft 21 or the shaft 21a and an adjacent edge of the mandrel 10 or 10a (defined by the point $b$ or the point $c$ in FIG. 10) when the longitudinal centers of the shafts 21 and 21a lie in the same vertical plane as the mandrel; and $r$ is the distance from the point $b$ to the center of the shaft 21 or 21a when this shaft has moved through an angle $\theta$ considering the point $b$ as the center, out of and from this plane. The abovementioned equation gives the path of travel of one of the shafts 21 or 21a as it moves out of this plane upwardly as seen in FIG. 10 and back into the plane adjacent the point $c$; and this equation also can be used to plot the path of return travel for the particular shaft 21 or 21a as it moves downwardly as seen in FIG. 10 out of the plane of the points $b$ and $c$ and returns to the vicinity of the point $b$. The shafts 21 and 21a move in the direction indicated by the arrows D in the figure. It will be understood, of course, that in the illustrated embodiments the shafts 21 and 21a, the sleeves 22 and 22a and the mandrels 10 or 10a are all vertically disposed; but, of course, these parts, as long as they are maintained parallel, could be in other dispositions.

It will be observed that both forms of mandrel, the mandrel 10 and the mandrel 10a, provide two straight side edges about which the webs A and B are wound; and, if desired, intermediate portions of each mandrel may be deleted without changing the winding action. The shafts 21 and 21a and the sleeves 22 and 22a move in the path shown in FIG. 10 and defined by the above Equation 1; and it will be observed from FIG. 10 that the path is in the form of an elongated loop 70 having its major axis 71 at an acute angle $\beta$ with respect to an axis 72 passing between the points $b$ and $c$ which define the straight side edges of the mandrel and with respect to the corresponding plane containing these side edges. The angle $\beta$, for example, may be 14 degrees; and it will be observed from FIG. 10 that the loop 70 is rotated by this angle in the direction D of movement of the shafts 21 and 21a about the central mandrel. The cam 27 has a cross sectional shape geometrically similar to the path 70, and it is located in the same disposition, that is, with its major axis coincident with the major axis 71 of the loop 70; however, the cam 27 is that much smaller than the path 70 which is equal to the effective thickness of the chain 28.

In developing the above Equation 1, it is postulated that:
$$dr/dt = \text{constant} \quad (2)$$
and that:
$$ds/dt = \text{constant} \quad (3)$$

The quantity $s$ represents the distance traveled about the cam 27 by the chain 28; and, since the velocity of travel of the chain 28 is constant, $ds/dt$ equals a constant. The derivative $dr/dt$, which is the rate of change of the quantity $r$ and is shown by a vector in FIG. 1, should likewise be a constant for the constant web unwind rate. Therefore:
$$dr/ds = K \quad (4)$$
$K$ being a constant; and, since the hypotenuse of a right angled triangle is the square root of the sum of the squares of the sides:
$$ds = \sqrt{dr^2 + (rd\theta)^2} \quad (5)$$

Utilizing Equations 4 and 5, and deleting $ds$, the following equation results:
$$dr^2 = K^2 [dr^2 + (rd\theta)^2] \quad (6)$$
Solving for $dr^2$, the following equation results:
$$(1 - K^2)(dr)^2 = K^2 r^2 d\theta^2 \quad (7)$$
Therefore:
$$\frac{dr}{r} = \frac{K}{\sqrt{1-K^2}} d\theta \quad (8)$$

Solving Equation 8 for $r$, the following results:
$$r = (\text{constant}) \cdot \left[ e\left(\frac{K}{\sqrt{1-K^2}}\right) \right]^\theta \quad (9)$$
or:
$$r = (C_1)(C_2)^{\theta/180°} \quad (10)$$
in which $C_1$ and $C_2$ are constants.

Now, using the following limits:
$$\theta = 0, \quad r = L \quad (11)$$
and
$$\theta = 180°, \quad r = L + 2a \quad (12)$$
and substituting these limits in Equation 10, it follows that:
$$C_1 = L \quad (13)$$
$$L + 2a = L(C_2) \quad (14)$$
and,
$$C_2 = \frac{L+2a}{L} \quad (15)$$

Substituting these constants in Equation 10, the following solution is found:
$$r = L \left(\frac{L+2a}{L}\right)^{\theta/180°} \quad (1)$$

In operation, the chain 28 is driven at a uniform speed about the cam 27. The roll carriage 14 is moved by the chain 28, since the carriage is connected to the chain by means of the shaft 24 and the link 31; and the carriage 13 moves along with the chain 28 due to similar connections with the chain. During this movement of the carriage 14, the web A passes under the guide bar 26 and shaft 23 and passes around the sleeve 22 onto the mandrel 10 (assuming that the first described form of mandrel is used); and the sheet B is applied onto the mandrel 10, in the same manner, from the carriage 13 which is spaced by 180° on the chain 28 and about the cam 27. The sheets A and B are thus laid onto the mandrel 10 in a helical manner so that they overlap slightly; and the webs A and B, as so disposed with respect to each other, are pulled up the mandrel by the rolls 34 and 35 between which the webs pass. As previously described, thermoplastic material of one type or another is included in the webs A and B, and one of the rolls 34 and 35 is heated so that the webs A and B as so disposed with respect to each other are formed into a single two-ply product in which the longitudinally extending fibers in the webs A and B extend slantwise with respect to the longitudinal dimension of the product.

The web guide sleeves 22 and 22a preferably travel in the path mathematically described by Equation 1 set forth above and shown in FIG. 10, and the sleeves 22 and 22a thus move toward and away from the longitudinal center of the mandrel 10 or 10a so as to maintain the tension of the webs A and B uniform as the carriages 13 and 14 travel about the mandrel and as the webs A and B are wound onto the mandrel, this being true even though the mandrel is flat. Wrinkling of the final product due to any tension changes in the webs is thus avoided.

The mandrel 10a shown in FIGS. 5 to 9 functions in the same manner as the mandrel 10; however, in this case the upward movement of the webs A and B on the mandrel 10a is assisted by means of the belts 50 and 51 which travel upwardly along the side edges of the mandrel 10a as the rolls 34 and 35 pull the bias laid webs A and B upwardly about the mandrel. The chain 66 is driven from a suitable power source at the appropriate speed so that the belts 50 and 51 travel upwardly at the same speed as the peripheral speed of the rolls 34 and 25. The chain 66 drives the sprockets 62 and 63, and these two sprockets respectively drive the rolls 56 and 56a which in turn drive the belts 51 and 50.

The spiral winding machine of the invention advantageously provides a uniform unwind rate of the webs A and B, since the quantities $dr/dt$, $ds/dt$ and $dz/dt$ are constants. As above mentioned, the quantity $ds/dt$ represents the speed of travel of the chain 28; the quantity $dr/dt$ is the speed with which the sleeves 22 and 22a travel in a horizontal direction away from edges of the mandrel 10 or 10a; and the quantity $dz/dt$ is the speed of upward movement of the webs on the mandrel. There thus is no jerking on or changes in tension in the webs A and B, and smooth winding operation may thus be had at higher web winding speeds than would otherwise be possible.

In addition, the spiral winding machine of the invention advantageously assures that there is no twisting of the webs A and B as they are wound onto the mandrel 10 or 10a. This is due to the fact that the web speed on the mandrel shown by the vertical vector $dz/dt$ in FIG. 1 and also the speeds of the sleeves 22 and 22a as they move away from the edges of the mandrel and shown in FIG. 1 by the horizontal vector $dr/dt$, are constants. Therefore, the angle $\delta$ shown in FIG. 1, which is the angle measured from horizontal to the edge of a web A or B as it is wound from a sleeve 22 or 22a onto the mandrel, remains constant; and thus, the webs do not become loose on one edge and tight on the other and do not twist, as they are wound onto the mandrel. Thus, for this reason also, uniformly of winding of the webs A and B onto the mandrel is obtained.

We claim:

1. Winding apparatus comprising a mandrel of non round cross section, means for holding a roll of a continuous length of material to be wound about the mandrel, a guide for guiding the material onto said mandrel and means for moving said guide about said mandrel in a guide path in which said guide moves toward and away from the central axis of the mandrel.

2. Winding apparatus as set forth in claim 1, said mandrel comprising two spaced straight edges and said guide path constituting an elongated loop having its long axis extending in the same general direction as an axis joining said two straight edges.

3. Winding apparatus as set forth in claim 1, said mandrel comprising two spaced straight edges and said guide path constituting an elongated loop having its long axis extending at an acute angle with respect to an axis joining said two straight edges.

4. Winding apparatus as set forth in claim 1, said mandrel comprising two spaced parallel straight edges and said guide moving means holding said guide parallel with said straight edges as the guide moves about said mandrel and moving the guide in a path constituting an elongated loop having its long axis extending at an acute angle which is measured between a plane joining said two straight edges and a point in the movement of said guide in said path in the direction in which the guide leaves said axis.

5. Winding apparatus as set forth in claim 4, said path being defined by the equation $$r = L\left(\frac{L+2a}{L}\right)^{\theta/180°}$$

in which $2a$ is the distance between said parallel straight edges, L is the separation between one of the straight edges and said guide as it passes through said plane, $r$ is the distance from one of said straight edges to said path measured in the direction of said guide as it passes through said plane, and $\theta$ is the angle through which the guide moves measured from said last named straight edge.

6. Winding apparatus as set forth in claim 1, in which said roll holding means includes a carriage connected to said guide and movable about said mandrel along with said guide.

7. Winding apparatus as set forth in claim 1, in which said roll holding means includes a carriage connected to said guide and movable about said mandrel along with said guide, and in which said mandrel comprises two spaced straight edges and said guide path constitutes an elongated loop having its long axis extending in the same general direction as an axis joining two said straight edges, said guide moving means including a cam of the same shape as said path and a chain extending around said cam and carrying said guide.

8. Winding apparatus as set forth in claim 7, said mandrell comprising a plate the side edges of which form said two spaced straight edges.

9. Winding apparatus as set forth in claim 1 and including a pair of calender rolls located at one end of said mandrel and means for driving said rolls so as to draw the material off of the mandrel after it has been wound thereon.

10. Winding apparatus as set forth in claim 1, said mandrel comprising two spaced straight edges and the material wound about the mandrel constituting a web of paperlike material, said roll holding means including a carriage which is connected to said guide and moves about said mandrel along with said guide and said carriage including standards for holding a roll of the web material in horizontal position and first and second auxiliary guides in addition to said first mentioned guide, said first auxiliary guide having its axis extending parallel with the axis of the roll and said second auxiliary guide having its axis extending at an acute angle with respect to said first auxiliary guide and directing the web onto said first mentioned guide, said guide path constituting an elongated loop having its long axis extending in the same general direction as an axis joining said two straight edges.

11. Winding apparatus as set forth in claim 1, said mandrel comprising two spaced parallel straight edges and said guide moving means being arranged to move said guide about said mandrel while maintaining the guide extending parallel with said straight edges, said path being defined by the following equation:

$$r = L\left(\frac{L+2a}{L}\right)^{\theta/180°}$$

wherein $2a$ is the distance between said straight edges, L is the separation between the guide and the adjacent straight edge as the guide passes through a plane containing said straight edges and $r$ is the distance from the last mentioned straight edge to said guide when the guide has passed from said plane through an angle $\theta$ measured between said plane and the guide with said last named straight edge as the apex.

12. Winding apparatus as set forth in claim 1, said mandrel comprising two spaced parallel straight edges and said guide path being provided by a cam extending around said straight edges, said guide moving means comprising a flexible element encircling said cam and movable thereabout and arranged to hold said guide parallel with said straight edges, said path being in the form of an elongated loop defined by the following equation:

$$r = L\left(\frac{L+2a}{L}\right)^{\theta/180°}$$

wherein $2a$ is the distance between said straight edges, L is the separation between said guide and an adjacent straight edge as it passes through a plane containing said straight edges and $r$ is the distance from said last mentioned straight edge to said guide when the guide has passed from said plane through an angle $\theta$ measured between said plane and the guide with said last mentioned straight edge as the apex, and said cam being geometrically similar to but smaller than said loop and having its major axis coinciding with the major axis of said loop.

References Cited

UNITED STATES PATENTS 3,112,234  11/1963  Krupp _____ 156—169
3,174,388  3/1965  Gaubatz _____ 156—169

BENJAMIN A. BORCHELT, Primary Examiner

T. H. WEBB, Assistant Examiner

U.S. Cl. X.R.

156—169